(12) United States Patent
Matsuo

(10) Patent No.: US 12,355,082 B2
(45) Date of Patent: Jul. 8, 2025

(54) BINDER COMPOSITION FOR SECONDARY BATTERY, SLURRY COMPOSITION FOR SECONDARY BATTERY, FUNCTIONAL LAYER FOR SECONDARY BATTERY, AND SECONDARY BATTERY

(71) Applicant: ZEON CORPORATION, Tokyo (JP)

(72) Inventor: Yusaku Matsuo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 571 days.

(21) Appl. No.: 17/755,045

(22) PCT Filed: Oct. 5, 2020

(86) PCT No.: PCT/JP2020/037779
§ 371 (c)(1),
(2) Date: Apr. 20, 2022

(87) PCT Pub. No.: WO2021/085044
PCT Pub. Date: May 6, 2021

(65) Prior Publication Data
US 2022/0384815 A1    Dec. 1, 2022

(30) Foreign Application Priority Data
Oct. 31, 2019 (JP) .................................. 2019-199238

(51) Int. Cl.
*H01M 4/62* (2006.01)
*C08F 220/18* (2006.01)
*C08L 33/08* (2006.01)

(52) U.S. Cl.
CPC ....... *H01M 4/622* (2013.01); *C08F 220/1804* (2020.02); *C08L 33/08* (2013.01)

(58) Field of Classification Search
CPC .... H01M 4/622; C08F 220/1804; C08L 33/08
USPC ....................................................... 429/217
See application file for complete search history.

(56) References Cited

U.S. PATENT DOCUMENTS

| | | | |
|---|---|---|---|
| 9,905,855 B2 | 2/2018 | Kinoshita et al. | |
| 2014/0178756 A1* | 6/2014 | Ishii | H01M 4/13 429/211 |
| 2016/0156039 A1* | 6/2016 | Kinoshita | H01M 4/13 526/279 |
| 2016/0204465 A1 | 7/2016 | Mimura et al. | |
| 2020/0395614 A1* | 12/2020 | Liu | C08F 2/44 |
| 2021/0111408 A1 | 4/2021 | Yusaku et al. | |

FOREIGN PATENT DOCUMENTS

| | | |
|---|---|---|
| CN | 104037419 A | 9/2014 |
| EP | 3581596 B1 | 9/2021 |
| JP | 2014175106 A | 9/2014 |
| JP | 2015088486 A | 5/2015 |
| JP | 2019139893 A | 8/2019 |
| JP | 2020057579 A | 4/2020 |
| JP | 2021022521 A | 2/2021 |
| WO | 2010114119 A1 | 10/2010 |
| WO | 2016136090 A1 | 9/2016 |
| WO | 2018145646 A1 | 8/2018 |
| WO | 2019087827 A1 | 5/2019 |
| WO | 2019131771 A1 | 7/2019 |

OTHER PUBLICATIONS

May 3, 2022, International Preliminary Report on Patentability issued in the International Patent Application No. PCT/JP2020/037779.
Jul. 29, 2024, the Extended European Search Report issued by the European Patent Office in the corresponding European Patent Application No. 20883123.0.
Dec. 15, 2020, International Search Report issued in the International Patent Application No. PCT/JP2020/037779.

* cited by examiner

*Primary Examiner* — Allison Bourke
*Assistant Examiner* — Robert Gene West
(74) *Attorney, Agent, or Firm* — KENJA IP LAW PC

(57) ABSTRACT

Provided is a binder composition that can produce a slurry composition having excellent preservation stability and that can cause a functional layer to display excellent adhesiveness. The binder composition contains a polymer and a solvent. The polymer includes a (meth)acrylic acid ester monomer unit including an aromatic hydrocarbon ring in a proportion of not less than 5 mass % and not more than 45 mass % and includes a structural unit indicated by formula (I), shown below, in a proportion of not less than 50 mass % and not more than 90 mass %. In formula (I), $R^1$ represents a hydrocarbon group having a carbon number of 4 or more that does not include an aromatic hydrocarbon ring and $R^2$ represents a hydrogen atom, a methyl group, or $-CH_2-C(=O)-O-R^1$. In a case in which more than one $R^1$ is present in formula (I), each $R^1$ may be the same or different.

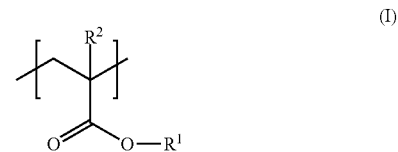

(I)

7 Claims, No Drawings

BINDER COMPOSITION FOR SECONDARY BATTERY, SLURRY COMPOSITION FOR SECONDARY BATTERY, FUNCTIONAL LAYER FOR SECONDARY BATTERY, AND SECONDARY BATTERY

TECHNICAL FIELD

The present disclosure relates to a binder composition for a secondary battery, a slurry composition for a secondary battery, a functional layer for a secondary battery, and a secondary battery.

BACKGROUND

Secondary batteries exemplified by non-aqueous electrolyte solution secondary batteries (hereinafter, also referred to simply as "non-aqueous secondary batteries") in which an organic solvent electrolyte is used, all-solid-state secondary batteries in which a solid electrolyte is used instead of an organic solvent electrolyte, and the like have characteristics such as compact size, light weight, high energy density, and the ability to be repeatedly charged and discharged, and are used in a wide variety of applications. Consequently, in recent years, studies have been made to improve battery members such as electrodes for the purpose of achieving even higher secondary battery performance.

A binder composition for a secondary battery that contains a polymer serving as a binder and a solvent may be used in the production of a battery member of a secondary battery. More specifically, a slurry composition for a secondary battery may be produced by mixing the binder composition with particles that are compounded in order to cause a battery member to display a desired function (hereinafter, referred to as "functional particles"), for example. Next, the solvent may be removed from the slurry composition for a secondary battery so as to form a functional layer for a secondary battery (electrode mixed material layer, solid electrolyte layer, etc.), and then this functional layer for a secondary battery can be used as a battery member or as part of a battery member.

Improvements have previously been made to binders used in the production of battery members in order to improve secondary battery performance (for example, refer to Patent Literature (PTL) 1 and 2).

CITATION LIST

Patent Literature

PTL 1: JP2015-88486A
PTL 2: WO2016/136090A1

SUMMARY

Technical Problem

However, there is room for improvement of a binder composition containing a conventional binder such as described above in terms of sufficiently ensuring preservation stability of a slurry composition while also causing a functional layer to display excellent adhesiveness.

Accordingly, one object of the present disclosure is to provide a binder composition for a secondary battery that can produce a slurry composition for a secondary battery having excellent preservation stability and that can cause a functional layer for a secondary battery to display excellent adhesiveness.

Another object of the present disclosure is to provide a slurry composition for a secondary battery that has excellent preservation stability and can form a functional layer for a secondary battery having excellent adhesiveness.

Yet another object of the present disclosure is to provide a functional layer for a secondary battery that has excellent adhesiveness and a secondary battery that includes this functional layer for a secondary battery.

Solution to Problem

The inventor conducted diligent investigation with the aim of solving the problem set forth above. The inventor reached a new finding that by using a polymer having a specific chemical composition as a binder contained in a binder composition for a secondary battery, it is possible to sufficiently ensure preservation stability of a slurry composition while also causing a functional layer to display excellent adhesiveness, and, in this manner, completed the present disclosure.

Specifically, the present disclosure aims to advantageously solve the problem set forth above, and a presently disclosed binder composition for a secondary battery comprises a polymer and a solvent, wherein the polymer includes a (meth)acrylic acid ester monomer unit including an aromatic hydrocarbon ring in a proportion of not less than 5 mass % and not more than 45 mass % and includes a structural unit indicated by formula (I), shown below, in a proportion of not less than 50 mass % and not more than 90 mass %,

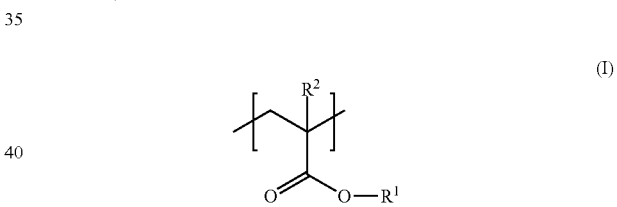

where, in formula (I), $R^1$ represents a hydrocarbon group having a carbon number of 4 or more that does not include an aromatic hydrocarbon ring, $R^2$ represents a hydrogen atom, a methyl group, or —$CH_2$—C(=O)—O—$R^1$, and in a case in which more than one $R^1$ is present in formula (I), each $R^1$ may be the same or different. By using a binder composition that contains a solvent and a polymer including a (meth)acrylic acid ester monomer unit that includes an aromatic hydrocarbon ring and a structural unit that is indicated by formula (I) (hereinafter, also referred to as structural unit (I)) in the proportions set forth above, it is possible to produce a slurry composition having excellent preservation stability and to form a functional layer having excellent adhesiveness from this slurry composition for a secondary battery.

As used in the present disclosure, the phrase "includes a monomer unit" means that "a polymer obtained with the monomer includes a structural unit derived from the monomer". Moreover, the proportional contents (mass % and mol %) of "structural units" (inclusive of "monomer units") in a polymer can be measured by a nuclear magnetic resonance (NMR) method such as $^1$H-NMR. Also note that in the present disclosure, "(meth)acryl" is used to indicate "acryl" and/or "methacryl".

In the presently disclosed binder composition for a secondary battery, a molar ratio of the (meth)acrylic acid ester monomer unit including the aromatic hydrocarbon ring relative to the structural unit indicated by formula (I) in the polymer is preferably not less than 0.08 and not more than 0.80. When the molar ratio of the (meth)acrylic acid ester monomer unit including the aromatic hydrocarbon ring relative to the structural unit (I) (proportional content (mol %) of (meth)acrylic acid ester monomer unit including aromatic hydrocarbon ring/proportional content (mol %) of structural unit (I)) is within the range set forth above, preservation stability of a slurry composition can be further improved.

In the presently disclosed binder composition for a secondary battery, the polymer preferably further includes one or more selected from the group consisting of a vinyl cyanide monomer unit, a diene monomer unit, and an aromatic vinyl monomer unit. When the polymer includes at least any one of the monomer units set forth above, adhesiveness of a functional layer and preservation stability of a slurry composition can be further improved.

Moreover, the present disclosure aims to advantageously solve the problem set forth above, and a presently disclosed slurry composition for a secondary battery comprises: functional particles; and any one of the binder compositions for a secondary battery set forth above. A slurry composition that contains functional particles and any one of the binder compositions set forth above has excellent preservation stability and can be used to form a functional layer having excellent adhesiveness.

In the presently disclosed slurry composition for a secondary battery, the functional particles may, for example, be one or more selected from the group consisting of electrode active material particles, solid electrolyte particles, and conductive material particles.

Furthermore, the present disclosure aims to advantageously solve the problem set forth above, and a presently disclosed functional layer for a secondary battery is formed using any one of the slurry compositions for a secondary battery set forth above. A functional layer that is formed using any one of the slurry compositions set forth above has excellent adhesiveness.

Also, the present disclosure aims to advantageously solve the problem set forth above, and a presently disclosed secondary battery comprises the functional layer for a secondary battery set forth above. A secondary battery that includes the functional layer set forth above has excellent cell characteristics such as output characteristics and cycle characteristics.

Advantageous Effect

According to the present disclosure, it is possible to provide a binder composition for a secondary battery that can produce a slurry composition for a secondary battery having excellent preservation stability and that can cause a functional layer for a secondary battery to display excellent adhesiveness.

Moreover, according to the present disclosure, it is possible to provide a slurry composition for a secondary battery that has excellent preservation stability and can form a functional layer for a secondary battery having excellent adhesiveness.

Furthermore, according to the present disclosure, it is possible to provide a functional layer for a secondary battery that has excellent adhesiveness and a secondary battery that includes this functional layer for a secondary battery.

DETAILED DESCRIPTION

The following provides a detailed description of embodiments of the present disclosure.

The presently disclosed binder composition for a secondary battery is used in production of a secondary battery such as a non-aqueous secondary battery or an all-solid-state secondary battery. For example, the presently disclosed binder composition for a secondary battery can be used in formation of a functional layer for a secondary battery (for example, a solid electrolyte layer containing solid electrolyte particles or an electrode mixed material layer containing electrode active material particles and optionally solid electrolyte particles and/or conductive material particles) that is a constituent of a battery member of a secondary battery. The presently disclosed slurry composition for a secondary battery is a slurry composition that contains the presently disclosed binder composition for a secondary battery and can be used in formation of a functional layer for a secondary battery. Moreover, the presently disclosed functional layer for a secondary battery is formed using the presently disclosed slurry composition for a secondary battery. Furthermore, the presently disclosed secondary battery includes the presently disclosed functional layer for a secondary battery.

(Binder Composition for Secondary Battery)

The presently disclosed binder composition contains a polymer and a solvent, and can optionally further contain other components. A feature of the presently disclosed binder composition is that the polymer includes a (meth)acrylic acid ester monomer unit including an aromatic hydrocarbon ring in a proportion of not less than 5 mass % and not more than 45 mass % and includes a structural unit indicated by formula (I), shown below, in a proportion of not less than 50 mass % and not more than 90 mass %.

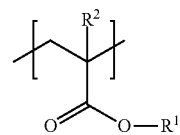

(I)

(In formula (I), $R^1$ represents a hydrocarbon group having a carbon number of 4 or more that does not include an aromatic hydrocarbon ring and $R^2$ represents a hydrogen atom, a methyl group, or $-CH_2-C(=O)-O-R^1$. In a case in which more than one $R^1$ is present in formula (I), each $R^1$ may be the same or different.)

As a result of the presently disclosed binder composition containing a solvent and a polymer that includes a (meth)acrylic acid ester monomer unit including an aromatic hydrocarbon ring and a structural unit (I) in the proportions set forth above, it is possible to provide a slurry composition for a secondary battery having excellent preservation stability and a functional layer for a secondary battery having excellent adhesiveness by using this binder composition.

<Polymer>

The polymer includes at least a (meth)acrylic acid ester monomer unit including an aromatic hydrocarbon ring and a structural unit (I) as described above, and may optionally include other structural units.

<<Chemical Composition>>
[(Meth)acrylic Acid Ester Monomer Unit Including Aromatic Hydrocarbon Ring]

The inclusion of a (meth)acrylic acid ester monomer unit including an aromatic hydrocarbon ring is presumed to cause particularly good adsorption of the polymer to electrode active material particles or conductive material particles having high affinity with an aromatic hydrocarbon ring, and to thereby enable the achievement of a good dispersion state in a slurry composition of these particles and improvement of preservation stability of the slurry composition. In addition, the (meth)acrylic acid ester monomer unit including an aromatic hydrocarbon ring can contribute to improving adhesive capability and flexibility of the polymer as a result of having a (meth)acrylic acid ester skeleton. Therefore, the polymer can improve adhesiveness of a functional layer as a result of including the (meth)acrylic acid ester monomer unit including an aromatic hydrocarbon ring.

The aromatic hydrocarbon ring that is included in the (meth)acrylic acid ester monomer unit including an aromatic hydrocarbon ring may be a benzene ring, naphthalene ring, or anthracene ring, for example, without any specific limitations. Of these aromatic hydrocarbon rings, a benzene ring is preferable. Note that the monomer unit may include one type of aromatic hydrocarbon ring or may include two or more types of aromatic hydrocarbon rings.

Although one or more hydrogen atoms on the aromatic hydrocarbon ring may be substituted for another group (halogen atom, etc.), it is preferable that the aromatic hydrocarbon ring does not include a substituent (i.e., is unsubstituted).

Examples of (meth)acrylic acid ester monomers including an aromatic hydrocarbon ring that can form the (meth)acrylic acid ester monomer unit including an aromatic hydrocarbon ring include phenoxyethyl (meth)acrylate, phenyl (meth)acrylate, ethoxylated o-phenylphenol (meth)acrylate, and phenoxypolyethylene glycol (meth)acrylate. One of these (meth)acrylic acid ester monomers including an aromatic hydrocarbon ring may be used individually, or two or more of these (meth)acrylic acid ester monomers including an aromatic hydrocarbon ring may be used in combination. Of these (meth)acrylic acid ester monomers including an aromatic hydrocarbon ring, phenoxyethyl (meth)acrylate and ethoxylated o-phenylphenol (meth)acrylate are preferable from a viewpoint of further improving adhesiveness of a functional layer while also enhancing cell characteristics of a secondary battery.

Note that in the present disclosure, "(meth)acrylate" is used to indicate "acrylate" and/or "methacrylate".

The proportion constituted by the (meth)acrylic acid ester monomer unit including an aromatic hydrocarbon ring among all structural units included in the polymer when all structural units are taken to be 100 mass % is required to be not less than 5 mass % and not more than 45 mass % as previously described, is preferably 7 mass % or more, and more preferably 10 mass % or more, and is preferably 43 mass % or less, more preferably 40 mass % or less, even more preferably 30 mass % or less, and particularly preferably 25 mass % or less. When the proportion constituted by the (meth)acrylic acid ester monomer unit including an aromatic hydrocarbon ring among all structural units is less than 5 mass %, adhesiveness of a functional layer decreases. On the other hand, when the proportion constituted by the (meth)acrylic acid ester monomer unit including an aromatic hydrocarbon ring among all structural units is more than 45 mass %, electrode active material particles and conductive material particles can be dispersed well, but dispersibility of solid electrolyte particles decreases. Consequently, it is not possible to ensure preservation stability of a slurry composition that contains solid electrolyte particles.

[Structural Unit Indicated by Formula (I)]

The structural unit (I) is indicated by formula (I), shown below.

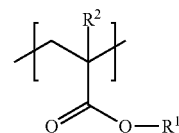

(I)

The inclusion of the structural unit (I) in the polymer enables the achievement of a good dispersion state of solid electrolyte particles in a slurry composition and can further improve preservation stability of the slurry composition, which is presumed to be due to the contribution of the hydrocarbon group of $R^1$ that has a carbon number of 4 or more and does not include an aromatic hydrocarbon ring. In addition, as a result of the structural unit (I) not including an aromatic hydrocarbon ring, the structural unit (I) can contribute to improving adhesive capability and flexibility of the polymer without excessively increasing the glass-transition temperature of the polymer. Therefore, the polymer can improve adhesiveness of a functional layer as a result of including the structural unit (I).

Note that the polymer may include just one type of the structural unit (I) or may include two or more types of the structural unit (I).

$R^1$ in formula (I) is not specifically limited so long as it is a hydrocarbon group in which the total number of carbon atoms is 4 or more and that does not include an aromatic hydrocarbon ring in the structure thereof, but is preferably an alkyl group having a carbon number of 4 or more, and more preferably an alkyl group having a carbon number of not less than 4 and not more than 12. The alkyl group having a carbon number of not less than 4 and not more than 12 may preferably be a butyl group (n-butyl group, sec-butyl group, isobutyl group, or tert-butyl group), a 2-ethylhexyl group, or a dodecyl group (lauryl group).

$R^2$ in formula (I) represents a hydrogen atom, a methyl group, or —$CH_2$—$C(=O)$—$O$—$R^1$. Specific examples of the $R^1$ included in $R^2$ include the same groups as for the previously described hydrocarbon group in $R^1$. Of these examples, a hydrogen atom or a methyl group is preferable as $R^2$.

The structural unit (I) can be introduced into the polymer by producing the polymer using a monomer having a corresponding structure. For example, in a case in which $R^1$ is an alkyl group having a carbon number of not less than 4 and not more than 12, the structural unit (I) can be introduced into the polymer by using, as a monomer, an ethylenically unsaturated carboxylic acid alkyl ester monomer in which the carbon number of an alkyl group bonded to a non-carbonyl oxygen atom is not less than 4 and not more than 12.

The ethylenically unsaturated carboxylic acid alkyl ester monomer in which the carbon number of the alkyl group bonded to the non-carbonyl oxygen atom is not less than 4 and not more than 12 may preferably be butyl (meth)acrylate (n-butyl (meth)acrylate, sec-butyl (meth)acrylate, isobutyl (meth)acrylate, or tert-butyl (meth)acrylate), 2-ethylhexyl (meth)acrylate, lauryl (meth)acrylate, or dibutyl itaconate. One of these ethylenically unsaturated carboxylic acid alkyl ester monomers may be used individually, or two or more of these ethylenically unsaturated carboxylic acid alkyl ester monomers may be used in combination.

The proportion constituted by the structural unit (I) among all structural units included in the polymer when all structural units are taken to be 100 mass % is required to be not less than 50 mass % and not more than 90 mass % as previously described, is preferably 55 mass % or more, and more preferably 60 mass % or more, and is preferably 85 mass % or less, more preferably 80 mass % or less, and even more preferably 70 mass % or less. When the proportion constituted by the structural unit (I) among all structural units is less than 50 mass %, adhesiveness of a functional layer decreases. On the other hand, when the proportion constituted by the structural unit (I) among all structural units is more than 90 mass %, solid electrolyte particles can be dispersed well, but dispersibility of electrode active material particles and conductive material particles decreases. Consequently, it is not possible to ensure preservation stability of a slurry composition that contains electrode active material particles and/or conductive material particles.

The molar ratio of the (meth)acrylic acid ester monomer unit including an aromatic hydrocarbon ring relative to the structural unit (I) is preferably 0.08 or more, more preferably 0.09 or more, even more preferably 0.10 or more, and particularly preferably 0.18 or more, and is preferably 0.80 or less, more preferably 0.65 or less, and even more preferably 0.50 or less. Particularly dispersibility of electrode active material particles and conductive material particles in a slurry composition can be improved when the aforementioned molar ratio is 0.08 or more, whereas dispersibility of solid electrolyte particles in a slurry composition can be improved when the aforementioned molar ratio is 0.80 or less. Therefore, preservation stability of a slurry composition can be further improved when the aforementioned molar ratio is within any of the ranges set forth above.

[Other Structural Units]

Examples of other structural units include, but are not specifically limited to, a vinyl cyanide monomer unit, a diene monomer unit, an aromatic vinyl monomer unit, and a cross-linkable monomer unit. Note that the polymer may include just one type of other structural unit or may include two or more types of other structural units. The polymer preferably includes one or more selected from the group consisting of a vinyl cyanide monomer unit, a diene monomer unit, and an aromatic vinyl monomer unit from a viewpoint of further improving preservation stability of a slurry composition and adhesiveness of a functional layer.

—Vinyl Cyanide Monomer Unit—

Examples of vinyl cyanide monomers that can form the vinyl cyanide monomer unit include acrylonitrile, methacrylonitrile, α-chloroacrylonitrile, and α-ethylacrylonitrile. One of these vinyl cyanide monomers may be used individually, or two or more of these vinyl cyanide monomers may be used in combination. Of these vinyl cyanide monomers, acrylonitrile is preferable.

The proportion constituted by the vinyl cyanide monomer unit among all structural units included in the polymer when all structural units are taken to be 100 mass % is preferably 3 mass % or more, more preferably 4 mass % or more, and even more preferably 5 mass % or more, and is preferably 40 mass % or less, more preferably 38 mass % or less, and even more preferably 35 mass % or less. Adhesiveness of a functional layer can be improved when the proportion constituted by the vinyl cyanide monomer unit among all structural units is 3 mass % or more, whereas solubility of the polymer in a solvent (particularly an organic solvent) can be sufficiently ensured and preservation stability of a slurry composition can be further improved when the proportion constituted by the vinyl cyanide monomer unit among all structural units is 40 mass % or less.

Particularly in a case in which the binder composition for a secondary battery is a binder composition for an all-solid-state secondary battery, the proportion constituted by the vinyl cyanide monomer unit among all structural units included in the polymer when all structural units are taken to be 100 mass % is preferably 5 mass % or more, more preferably 6 mass % or more, and even more preferably 7 mass % or more, and is preferably 40 mass % or less, more preferably 38 mass % or less, and even more preferably 35 mass % or less. A good dispersion state of solid electrolyte particles in a slurry composition can be achieved and preservation stability of the slurry composition can be further improved when the proportion constituted by the vinyl cyanide monomer unit among all structural units is 5 mass % or more, whereas solubility of the polymer in a solvent (particularly an organic solvent) can be sufficiently ensured and preservation stability of a slurry composition can be further improved when the proportion constituted by the vinyl cyanide monomer unit among all structural units is 40 mass % or less.

Moreover, particularly in a case in which the binder composition for a secondary battery is a binder composition for a non-aqueous secondary battery such as a lithium ion secondary battery, the proportion constituted by the vinyl cyanide monomer unit among all structural units included in the polymer when all structural units are taken to be 100 mass % is preferably 3 mass % or more, more preferably 4 mass % or more, and even more preferably 5 mass % or more, and is preferably 40 mass % or less, more preferably 38 mass % or less, and even more preferably 35 mass % or less. Leveling performance of a slurry composition can be improved when the proportion constituted by the vinyl cyanide monomer unit among all structural units is 3 mass % or more, whereas solubility of the polymer in a solvent (particularly an organic solvent) can be sufficiently ensured and preservation stability of a slurry composition can be further improved when the proportion constituted by the vinyl cyanide monomer unit among all structural units is 40 mass % or less.

—Diene Monomer Unit—

Examples of diene monomers that can form the diene monomer unit include aliphatic conjugated diene monomers such as 1,3-butadiene, isoprene, 2,3-dimethyl-1,3-butadiene, and 1,3-pentadiene. One of these diene monomers may be used individually, or two or more of these diene monomers may be used in combination.

Note that the term "diene monomer unit" as used in the present disclosure is inclusive of a structural unit (hydrogenated unit) obtained through hydrogenation of a monomer unit included in a polymer that has been obtained using a diene monomer.

Of the diene monomers described above, 1,3-butadiene and isoprene are preferable. In other words, the diene monomer unit is preferably a 1,3-butadiene unit, an isoprene unit, a hydrogenated 1,3-butadiene unit, or a hydrogenated isoprene unit.

In a case in which the polymer includes a diene monomer unit, the proportion constituted by the diene monomer unit among all structural units included in the polymer when all structural units are taken to be 100 mass % is preferably 5 mass % or more, more preferably 6 mass % or more, and even more preferably 7 mass % or more, and is preferably 40 mass % or less, more preferably 38 mass % or less, and even more preferably 35 mass % or less. When the proportion constituted by the diene monomer unit among all structural units is 5 mass % or more, an even better dispersion state of electrode active material particles and conductive material particles in a slurry composition can be achieved, and preservation stability of a slurry composition that contains electrode active material particles and/or conductive material particles can be further improved. On the other hand, when the proportion constituted by the diene monomer unit among all structural units is 40 mass % or less, adhesiveness of a functional layer can be sufficiently ensured.

—Aromatic Vinyl Monomer Unit—

Examples of aromatic vinyl monomers that can form the aromatic vinyl monomer unit include styrene, styrene sulfonic acid and salts thereof, α-methylstyrene, p-t-butylstyrene, butoxystyrene, vinyltoluene, chlorostyrene, and vinylnaphthalene. One of these aromatic vinyl monomers may be used individually, or two or more of these aromatic vinyl monomers may be used in combination. Of these aromatic vinyl monomers, styrene is preferable.

The term "aromatic vinyl monomer" as used in the present disclosure is considered to not be inclusive of a monomer corresponding to a (meth)acrylic acid ester monomer that includes an aromatic hydrocarbon ring (i.e., the term "aromatic vinyl monomer unit" is not inclusive of a (meth)acrylic acid ester monomer unit including an aromatic hydrocarbon ring).

In a case in which the polymer includes an aromatic vinyl monomer unit, the proportion constituted by the aromatic vinyl monomer unit among all structural units included in the polymer when all structural units are taken to be 100 mass % is preferably 5 mass % or more, more preferably 6 mass % or more, and even more preferably 7 mass % or more, and is preferably 40 mass % or less, more preferably 38 mass % or less, and even more preferably 35 mass % or less. When the proportion constituted by the aromatic vinyl monomer unit among all structural units is 5 mass % or more, a good dispersion state of electrode active material particles and conductive material particles in a slurry composition can be achieved, and preservation stability of a slurry composition that contains electrode active material particles and/or conductive material particles can be further improved. On the other hand, when the proportion constituted by the aromatic vinyl monomer unit among all structural units is 40 mass % or less, adhesiveness of a functional layer can be sufficiently ensured.

—Cross-Linkable Monomer Unit—

Cross-linkable monomers that can form the cross-linkable monomer unit are monomers having two or more polymerizable structures (olefinic double bonds, epoxy groups, etc.) per one molecule. For example, allyl (meth)acrylate, allyl glycidyl ether, or ethylene glycol di(meth)acrylate may be used as a cross-linkable monomer. One of these cross-linkable monomers may be used individually, or two or more of these cross-linkable monomers may be used in combination.

In a case in which the polymer includes a cross-linkable monomer unit, the proportion constituted by the cross-linkable monomer unit among all structural units included in the polymer when all structural units are taken to be 100 mass % can be set as 0.1 mass % or more, and is preferably 5 mass % or less, more preferably 4 mass % or less, and even more preferably 3 mass % or less.

<<Properties>>

The polymer may have good solubility or poor solubility in a solvent contained in a binder composition or slurry composition. In other words, the polymer may be dissolved in a solvent or may be dispersed in a solvent in a particulate form in a binder composition or slurry composition.

When a polymer is said to have "good solubility in a solvent" in the present disclosure, this means that the amount of solvent-insoluble content is less than 50 mass %, and when a polymer is said to have "poor solubility in a solvent" in the present disclosure, this means that the amount of solvent-insoluble content is 50 mass % or more.

Note that the "amount of solvent-insoluble content" can be measured by a method described in the EXAMPLES section. Moreover, the "amount of solvent-insoluble content" in the polymer can be adjusted by altering the types of monomers used to produce the polymer, the weight-average molecular weight of the polymer, and so forth. For example, the amount of solvent-insoluble content can be reduced by reducing the amount of a vinyl cyanide monomer and/or cross-linkable monomer used to produce the polymer.

The polymer preferably has good solubility in a solvent contained in a binder composition or slurry composition in a case in which the binder composition is a binder composition for an all-solid-state secondary battery. When the polymer has good solubility in a solvent, a good dispersion state of solid electrolyte particles or the like in a slurry composition can be achieved, and preservation stability of the slurry composition can be further improved. In addition, adhesiveness of a functional layer can be further increased, and cell characteristics of a secondary battery can be improved.

<<Production Method>>

No specific limitations are placed on the method by which the polymer is produced. For example, the polymer can be produced by polymerizing a monomer composition containing the monomers described above and then optionally performing hydrogenation.

Note that the proportional content of each monomer in the monomer composition can be set in accordance with the proportional content of each monomer unit or structural unit in the polymer.

The method of polymerization is not specifically limited and may be any of solution polymerization, suspension polymerization, bulk polymerization, emulsion polymerization, and the like. A known emulsifier or polymerization initiator may be used in these polymerization methods as necessary.

The method of hydrogenation is not specifically limited and may be a typical method using a catalyst (for example, refer to WO2012/165120A1, WO2013/080989A1, and JP2013-8485A).

<Solvent>

The solvent can be selected as appropriate depending on the application of the binder composition without any specific limitations and may be either of water or an organic solvent. Examples of organic solvents that may be used include chain aliphatic hydrocarbons such as hexane; cyclic aliphatic hydrocarbons such as cyclopentane and cyclohexane; aromatic hydrocarbons such as toluene and xylene; ketones such as ethyl methyl ketone, cyclohexanone, and diisobutyl ketone; esters such as ethyl acetate, butyl acetate, butyl butyrate, hexyl butyrate, γ-butyrolactone, and ε-caprolactone; acylonitriles such as acetonitrile and propionitrile; ethers such as tetrahydrofuran, ethylene glycol diethyl ether, and n-butyl ether; alcohols such as methanol, ethanol, isopropanol, ethylene glycol, and ethylene glycol monomethyl ether; and amides such as N-methylpyrrolidone and N,N-dimethylformamide.

One solvent may be used individually, or two or more solvents may be used in combination.

In a case in which the binder composition is used to produce a slurry composition for an all-solid-state secondary battery, the solvent is preferably xylene, butyl butyrate, hexyl butyrate, n-butyl ether, or diisobutyl ketone from a viewpoint of increasing dispersibility of solid electrolyte particles while also inhibiting degradation due to side reactions, further improving preservation stability of the slurry composition for an all-solid-state secondary battery, and improving cell characteristics of an all-solid-state secondary battery, and is more preferably xylene or diisobutyl ketone.

Moreover, in a case in which the binder composition is used to produce a slurry composition for a non-aqueous secondary battery positive electrode mixed material layer, the solvent is preferably N-methylpyrrolidone.

Furthermore, in a case in which the binder composition is used to produce a slurry composition for a non-aqueous secondary battery negative electrode mixed material layer, the solvent is preferably water.

<Other Components>

Examples of other components that can optionally be contained in the binder composition for a secondary battery include, but are not specifically limited to, binders other than the polymer described above, dispersants, leveling agents, defoamers, and reinforcing materials. These other components are not specifically limited so long as they do not influence battery reactions. One of these components may be used individually, or two or more of these components may be used in combination in a freely selected ratio.

<Production Method of Binder Composition>

No specific limitations are placed on the method by which the presently disclosed binder composition is produced. For example, the binder composition can be produced by performing solvent exchange, addition of other components, and so forth, as necessary, with respect to a water dispersion of the polymer serving as a binder that has been obtained as previously described.

(Slurry Composition for Secondary Battery)

The presently disclosed slurry composition for a secondary battery contains functional particles and the presently disclosed binder composition for a secondary battery set forth above. In other words, the presently disclosed slurry composition for a secondary battery contains functional particles, the specific polymer described above, and a solvent, and optionally contains other components. The presently disclosed slurry composition for a secondary battery has excellent preservation stability and can be used to form a functional layer having excellent adhesiveness as a result of containing the presently disclosed binder composition.

<Functional Particles>

The functional particles contained in the slurry composition for a secondary battery can, for example, be selected as appropriate depending on the application of the slurry composition (type of functional layer that is to be produced using the slurry composition).

The functional particles may preferably be electrode active material particles, solid electrolyte particles, and/or conductive material particles.

<<Electrode Active Material Particles>>

The electrode active material particles are particles that give and receive electrons in an electrode of a secondary battery. Although the following describes, as examples, a case in which the slurry composition for a secondary battery is a slurry composition for an all-solid-state lithium ion secondary battery electrode mixed material layer and a case in which the slurry composition for a secondary battery is a slurry composition for a non-aqueous lithium ion secondary battery electrode mixed material layer, the presently disclosed slurry composition for a secondary battery is not limited to the following examples.

[Electrode Active Material Particles of all-Solid-State Lithium Ion Secondary Battery]

Positive electrode active material particles for an all-solid-state lithium ion secondary battery may be positive electrode active material particles formed of an inorganic compound or positive electrode active material particles formed of an organic compound without any specific limitations.

The positive electrode active material particles formed of an inorganic compound may be particles formed of a transition metal oxide, a complex oxide of lithium and a transition metal (lithium-containing complex metal oxide), a transition metal sulfide, or the like, for example. The aforementioned transition metal may be Fe, Co, Ni, Mn, or the like. Specific examples of inorganic compounds that may be used in the positive electrode active material include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O-P_2O_5$, $MoO_3$, $V_2O_5$, and $V_6O_{13}$. These compounds may have undergone partial element substitution.

The positive electrode active material particles formed of an organic compound may be a polyaniline, polypyrrole, polyacene, disulfide compound, polysulfide compound, N-fluoropyridinium salt, or the like, for example.

The positive electrode active material particles described above can be used individually or as a mixture of two or more types.

Moreover, the particle diameter of the positive electrode active material particles described above can be the same as that of conventionally used positive electrode active material particles without any specific limitations.

Negative electrode active material particles for an all-solid-state lithium ion secondary battery may be particles formed of an allotrope of carbon such as graphite or coke. Note that negative electrode active material particles formed of an allotrope of carbon can be used in a mixed or coated form with a metal, metal salt, oxide, or the like. Examples of negative electrode active material particles that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The negative electrode active material particles described above can be used individually or as a mixture of two or more types.

Moreover, the particle diameter of the negative electrode active material particles described above can be the same as that of conventionally used negative electrode active material particles without any specific limitations.

[Electrode Active Material Particles of Non-Aqueous Lithium Ion Secondary Battery]

Positive electrode active material particles for a non-aqueous lithium ion secondary battery may, without any specific limitations, be particles formed of a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn (Li(CoMnNi)O$_2$), a lithium-containing complex oxide of Ni—Mn—Al, a lithium-containing complex oxide of Ni—Co—Al, olivine-type lithium iron phosphate (LiFePO$_4$), olivine-type lithium manganese phosphate (LiMnPO$_4$), a lithium-rich spinel compound represented by Li$_{1+x}$Mn$_{2-x}$O$_4$ (0<x<2), Li[Ni$_{0.17}$Li$_{0.2}$Co$_{0.07}$Mn$_{0.56}$]O$_2$, or LiNi$_{0.5}$Mn$_{1.5}$O$_4$.

The positive electrode active material particles described above can be used individually or as a mixture of two or more types.

Moreover, the particle diameter of the positive electrode active material particles described above can be the same as that of conventionally used positive electrode active material particles without any specific limitations.

Negative electrode active material particles for a non-aqueous lithium ion secondary battery may, without any specific limitations, be particles formed of a known negative electrode active material such as a carbon-based active material, a silicone-based active material, a simple substance of metal that can form a lithium alloy, or an alloy.

The negative electrode active material particles described above can be used individually or as a mixture of two or more types.

Moreover, the particle diameter of the negative electrode active material particles described above can be the same as that of conventionally used negative electrode active material particles without any specific limitations.

<Solid Electrolyte Particles>

The solid electrolyte particles are particles that conduct ions in an electrode and a solid electrolyte layer of an all-solid-state secondary battery. Any particles formed of a solid that displays ion conductivity can be used as solid electrolyte particles that are used in an all-solid-state lithium ion secondary battery without any specific limitations, but the use of particles formed of an inorganic solid electrolyte (inorganic solid electrolyte particles) is preferable.

The inorganic solid electrolyte may be a crystalline inorganic lithium ion conductor, an amorphous inorganic lithium ion conductor, or a mixture thereof without any specific limitations.

Examples of crystalline inorganic lithium ion conductors include Li$_3$N, LISICON (Li$_{14}$Zn(GeO$_4$)$_4$), perovskite-type lithium ion conductors (for example, Li$_{0.5}$La$_{0.5}$TiO$_3$), garnet-type lithium ion conductors (for example, Li$_7$La$_3$Zr$_2$O$_{12}$), LIPON (Li$_{3+y}$PO$_{4-x}$N$_x$), and Thio-LISICON (Li$_{3.25}$Ge$_{0.25}$P$_{0.75}$S$_4$).

The crystalline inorganic lithium ion conductors described above can be used individually or as a mixture of two or more types.

The amorphous inorganic lithium ion conductor may, for example, be a sulfur atom-containing substance that displays ion conductivity. More specific examples include glass Li—Si—S—O, Li—P—S, and an amorphous inorganic lithium ion conductor obtained using a raw material composition containing Li$_2$S and a sulfide of an element belonging to any one of groups 13 to 15 of the periodic table.

The element belonging to any one of groups 13 to 15 may be Al, Si, Ge, P, As, Sb, or the like, for example. Moreover, the sulfide of the element belonging to any one of groups 13 to 15 may, more specifically, be Al$_2$S$_3$, SiS$_2$, GeS$_2$, P$_2$S$_3$, P$_2$S$_5$, As$_2$S$_3$, Sb$_2$S$_3$, or the like. The method by which the amorphous inorganic lithium ion conductor is synthesized using the raw material composition may be an amorphization method such as mechanical milling or melt quenching, for example. The amorphous inorganic lithium ion conductor that is obtained using the raw material composition containing Li$_2$S and the sulfide of the element belonging to any one of groups 13 to 15 of the periodic table is preferably Li$_2$S—P$_2$S$_5$, Li$_2$S—SiS$_2$, Li$_2$S—GeS$_2$, or Li$_2$S—Al$_2$S$_3$, and more preferably Li$_2$S—P$_2$S$_5$.

The amorphous inorganic lithium ion conductors described above can be used individually or as a mixture of two or more types.

Of the examples described above, an amorphous sulfide containing Li and P or Li$_7$La$_3$Zr$_2$O$_{12}$ is preferable as the inorganic solid electrolyte for an all-solid-state lithium ion secondary battery from a viewpoint of forming a solid electrolyte-containing layer having excellent ion conductivity. As a result of having high lithium ion conductivity, an amorphous sulfide containing Li and P or Li$_7$La$_3$Zr$_2$O$_{12}$ can reduce the internal resistance of a battery and improve output characteristics of the battery when used as the inorganic solid electrolyte.

The amorphous sulfide containing Li and P is more preferably sulfide glass formed of Li$_2$S and P$_2$S$_5$, and particularly preferably sulfide glass produced from a mixed raw material of Li$_2$S and P$_2$S$_5$ in which the molar ratio of Li$_2$S:P$_2$S$_5$ is 65:35 to 85:15 from a viewpoint of reducing internal resistance and improving output characteristics of a battery. Moreover, the amorphous sulfide containing Li and P is preferably sulfide glass-ceramic that is obtained by reacting a mixed raw material of Li$_2$S and P$_2$S$_5$ in which the molar ratio of Li$_2$S:P$_2$S$_5$ is 65:35 to 85:15 by a mechanochemical method. The molar ratio of Li$_2$S:P$_2$S$_5$ in the mixed raw material is preferably 68:32 to 80:20 from a viewpoint of maintaining a state of high lithium ion conductivity.

Note that the inorganic solid electrolyte may contain one or more sulfides selected from the group consisting of Al$_2$S$_3$, B$_2$S$_3$, and SiS$_2$ as a starting material other than Li$_2$S and P$_2$S$_5$ to the extent that ion conductivity is not reduced. The addition of such a sulfide can stabilize a glass component in the inorganic solid electrolyte.

In the same manner, the inorganic solid electrolyte may contain one or more ortho-oxoacid lithium salts selected from the group consisting of Li$_3$PO$_4$, Li$_4$SiO$_4$, Li$_4$GeO$_4$, Li$_3$BO$_3$, and Li$_3$AlO$_3$, in addition to Li$_2$S and P$_2$S$_5$. The inclusion of such an ortho-oxoacid lithium salt can stabilize a glass component in the inorganic solid electrolyte.

The solid electrolyte particles described above can be used individually or as a mixture of two or more types.

Moreover, the particle diameter of the solid electrolyte particles described above can be the same as that of conventionally used solid electrolyte particles without any specific limitations.

<Conductive Material Particles>

The conductive material particles ensure electrical contact among an electrode active material in an electrode mixed material layer. Particles formed of known conductive substances can be used as the conductive material particles without any specific limitations. The shape of the conductive material particles is not specifically limited and may be any shape such as a roughly spherical shape, a fibrous shape, or a plate shape.

Examples of conductive material particles that may be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

The conductive material particles described above can be used individually or as a mixture of two or more types.

The size (particle diameter, fiber diameter, fiber length, etc.) of the conductive material particles described above can be the same as that of conventionally used conductive material particles without any specific limitations.

<Binder Composition>

The binder composition used to produce the slurry composition is the presently disclosed binder composition for a secondary battery set forth above that contains a polymer and a solvent and that optionally contains other components.

The mixing ratio of the functional particles and the binder composition for a secondary battery containing the polymer and solvent is not specifically limited and can be adjusted as appropriate depending on the application of the slurry composition and the type of functional particles.

In a case in which the slurry composition is a slurry composition for an all-solid-state secondary battery, for example, the amount of the polymer contained in the slurry composition for an all-solid-state secondary battery is preferably 0.1 parts by mass or more, more preferably 0.2 parts by mass or more, and even more preferably 0.3 parts by mass or more per 100 parts by mass of solid electrolyte particles serving as the functional particles, and is preferably 10 parts by mass or less, more preferably 8 parts by mass or less, and even more preferably 5 parts by mass or less per 100 parts by mass of the solid electrolyte particles. When the content of the polymer in the slurry composition for an all-solid-state secondary battery is 0.1 parts by mass or more per 100 parts by mass of solid electrolyte particles, the polymer can display sufficient function as a binder while also causing good dispersion of the solid electrolyte particles. Consequently, preservation stability of the slurry composition can be further increased while also even further improving ion conductivity of a functional layer (solid electrolyte layer or electrode mixed material layer) and enhancing cell characteristics of an all-solid-state secondary battery. On the other hand, when the content of the polymer in the slurry composition for an all-solid-state secondary battery is 10 parts by mass or less per 100 parts by mass of solid electrolyte particles, ion conductivity of a functional layer (solid electrolyte layer or electrode mixed material layer) can be sufficiently ensured, and excessive loss of cell characteristics of an all-solid-state secondary battery does not occur.

Moreover, in a case in which the slurry composition is a slurry composition for a non-aqueous secondary battery electrode mixed material layer, for example, the amount of the polymer contained in the slurry composition for a non-aqueous secondary battery electrode mixed material layer is preferably 0.1 parts by mass or more, more preferably 0.2 parts by mass or more, and even more preferably 0.3 parts by mass or more per 100 parts by mass of electrode active material particles serving as the functional particles, and is preferably 10 parts by mass or less, more preferably 8 parts by mass or less, and even more preferably 5 parts by mass or less per 100 parts by mass of the electrode active material particles. When the content of the polymer in the slurry composition for a non-aqueous secondary battery electrode mixed material layer is 0.1 parts by mass or more per 100 parts by mass of electrode active material particles, the polymer can display sufficient function as a binder while also causing good dispersion of the electrode active material particles. Consequently, preservation stability of the slurry composition can be further increased while also obtaining an electrode mixed material layer throughout which electrode active material particles are uniformly present and enhancing cell characteristics of a non-aqueous secondary battery. On the other hand, when the content of the polymer in the slurry composition for a non-aqueous secondary battery electrode mixed material layer is 10 parts by mass or less per 100 parts by mass of electrode active material particles, resistance of an electrode mixed material layer does not excessively increase, and cell characteristics of a non-aqueous secondary battery can be sufficiently ensured.

<Production of Slurry Composition>

No specific limitations are placed on the method by which the presently disclosed slurry composition is produced. For example, the slurry composition can be produced by mixing the functional particles and the presently disclosed binder composition by a known mixing method.

Note that in a case in which the presently disclosed slurry composition is a slurry composition for an electrode mixed material layer, the slurry composition may be produced by mixing electrode active material particles and conductive material particles serving as functional particles with the presently disclosed binder composition, or may be produced by mixing conductive material particles serving as functional particles and the presently disclosed binder composition to produce a slurry composition (conductive material paste containing conductive material particles and binder composition) and subsequently mixing the conductive material paste and electrode active material particles serving as functional particles, for example.

(Functional Layer for Secondary Battery)

The presently disclosed functional layer is a layer that contains functional particles and a polymer serving as a binder. The functional layer may be an electrode mixed material layer (positive electrode mixed material layer or negative electrode mixed material layer) that gives and receives electrons through electrochemical reactions, a solid electrolyte layer that is disposed between a positive electrode mixed material layer and a negative electrode mixed material layer that are in opposition to each other in an all-solid-state secondary battery, or the like, for example.

Moreover, the presently disclosed functional layer is a layer that is formed using the presently disclosed slurry composition set forth above and can be produced by, for example, applying the slurry composition set forth above onto the surface of a suitable substrate to form a coating film and subsequently drying the coating film that has been formed. In other words, the presently disclosed functional layer is formed of a dried product of the slurry composition set forth above, normally contains functional particles and a polymer, and can optionally further contain other components. Note that components contained in the functional layer are components that were contained in the slurry composition set forth above, and the content ratio of these components is normally the same as the content ratio thereof in the slurry composition.

The presently disclosed functional layer has excellent adhesiveness as a result of being formed using the presently disclosed slurry composition.

<Substrate>

No limitations are placed on the substrate onto which the slurry composition is applied. For example, a coating film of the slurry composition may be formed on the surface of a releasable substrate, this coating film may be dried to form a functional layer, and then the releasable substrate may be peeled from the functional layer. The functional layer that has been peeled from the releasable substrate in this manner can be used as a free-standing film to form a battery member (for example, an electrode or a solid electrolyte layer) of a secondary battery.

However, it is preferable that a current collector or an electrode is used as the substrate from a viewpoint of raising battery member production efficiency since a step of peeling the functional layer can be omitted. More specifically, in a situation in which an electrode mixed material layer is to be produced, the slurry composition is preferably applied onto a current collector serving as a substrate. Moreover, in a situation in which a solid electrolyte layer is to b e produced, the slurry composition is preferably applied onto an electrode (positive electrode or negative electrode).

<<Current Collector>>

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Electrode>>

The electrode (positive electrode or negative electrode) is not specifically limited and may be an electrode that is obtained by forming an electrode mixed material layer that contains at least electrode active material particles and a binder (and also solid electrolyte particles in the case of an electrode for an all-solid-state secondary battery) on a current collector such as described above.

The electrode active material particles, binder, and solid electrolyte particles contained in the electrode mixed material layer of the electrode are not specifically limited, and known examples thereof can be used. Note that the electrode mixed material layer of the electrode may be a layer that corresponds to the presently disclosed functional layer.

<Formation Method of Functional Layer>

Examples of methods by which the functional layer may be formed on a substrate such as the current collector or electrode described above include:

(1) a method in which the presently disclosed slurry composition is applied onto the surface of a substrate (surface at the electrode mixed material layer-side in the case of an electrode; same applies below) and is then dried;

(2) a method in which a substrate is immersed in the presently disclosed slurry composition and is then dried; and (3) a method in which the presently disclosed slurry composition is applied onto a releasable substrate and is dried to produce a functional layer that is then transferred onto the surface of an electrode or the like.

Of these methods, method (1) is particularly preferable since it allows simple control of the thickness of the functional layer. In more detail, method (1) includes a step of applying the slurry composition onto a substrate (application step) and a step of drying the slurry composition that has been applied onto the substrate to form a functional layer (functional layer formation step).

<<Application Step>>

Examples of methods by which the slurry composition may be applied onto the substrate in the application step include, but are not specifically limited to, doctor blading, reverse roll coating, direct roll coating, gravure coating, extrusion coating, and brush coating.

<<Functional Layer Formation Step>>

The method by which the slurry composition on the substrate is dried in the functional layer formation step is not specifically limited and may be a commonly known method. Examples of drying methods that may be used include drying by warm, hot, or low-humidity air, drying in a vacuum, and drying by irradiation with infrared light, electron beams, or the like.

In a case in which the functional layer is an electrode mixed material layer, the functional layer is preferably subjected to a pressing process by roll pressing or the like after drying. The pressing process enables further densification of the obtained electrode mixed material layer.

(Secondary Battery)

The presently disclosed secondary battery includes the functional layer for a secondary battery set forth above.

In a case in which the presently disclosed secondary battery is an all-solid-state secondary battery, for example, the presently disclosed all-solid-state secondary battery normally includes a positive electrode, a negative electrode, and a solid electrolyte layer, and has the presently disclosed functional layer as at least one of a positive electrode mixed material layer of the positive electrode, a negative electrode mixed material layer of the negative electrode, and the solid electrolyte layer.

Moreover, in a case in which the presently disclosed secondary battery is a non-aqueous secondary battery, for example, the presently disclosed non-aqueous secondary battery normally includes a positive electrode, a negative electrode, an electrolyte solution, and a separator, and has the presently disclosed functional layer as at least one of a positive electrode mixed material layer of the positive electrode and a negative electrode mixed material layer of the negative electrode.

The presently disclosed secondary battery has excellent cell characteristics such as output characteristics and cycle characteristics as a result of including the presently disclosed functional layer.

<All-Solid-State Secondary Battery>

Note that any electrode for an all-solid-state secondary battery can be used in the presently disclosed all-solid-state secondary battery as an electrode for an all-solid-state secondary battery including an electrode mixed material layer that does not correspond to the presently disclosed functional layer without any specific limitations so long as it includes an electrode mixed material layer that does not correspond to the presently disclosed functional layer.

Moreover, any solid electrolyte layer such as a solid electrolyte layer described in JP2012-243476A, JP2013-143299A, JP2016-143614A, or the like can be used without any specific limitations in the presently disclosed all-solid-state secondary battery as a solid electrolyte layer that does not correspond to the presently disclosed functional layer.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer, optionally performing pressing to obtain a laminate, subsequently placing the laminate in a battery container in that form or after rolling, folding, or the like in accordance with the battery shape, and then sealing the battery container. Note that an expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, button type, sheet type, cylinder type, prismatic type, flat type, or the like.

<Non-Aqueous Secondary Battery>

Note that any electrode for a non-aqueous secondary battery can be used in the presently disclosed non-aqueous secondary battery as an electrode for a non-aqueous secondary battery including an electrode mixed material layer that does not correspond to the presently disclosed functional layer without any specific limitations so long as it includes an electrode mixed material layer that does not correspond to the presently disclosed functional layer.

The electrolyte solution is normally an organic electrolyte solution obtained by dissolving a supporting electrolyte in an organic solvent. For example, a lithium salt is used as a supporting electrolyte in a non-aqueous lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of an organic solvent used in an electrolyte solution of a non-aqueous lithium ion secondary battery, for example, include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

The separator may be a separator such as described in JP2012-204303A, for example, but is not specifically limited thereto. Of such separators, a microporous membrane formed of a polyolefinic (polyethylene, polypropylene, polybutene, or polyvinyl chloride) resin is preferable in terms that such a membrane can reduce the overall thickness of the separator and can thereby increase the ratio of electrode active material particles in the non-aqueous secondary battery and increase the volumetric capacity.

The non-aqueous secondary battery can be produced by, for example, stacking the positive electrode and the negative electrode with the separator in-between, performing rolling, folding, or the like of the resultant laminate as necessary in accordance with the battery shape to place the laminate in a battery container, injecting the electrolyte solution into the battery container, and sealing the battery container. Note that an expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, the following methods were used in the examples and comparative examples to measure or evaluate the chemical composition and amount of solvent-insoluble content of a polymer, the dispersibility and preservation stability of a slurry composition, the adhesiveness of a functional layer (electrode mixed material layer), and the output characteristics, cycle characteristics, and post-slurry-preservation cycle characteristics of a secondary battery.

<Chemical Composition>

After coagulating 100 g of a binder composition containing a polymer in 1 L of methanol, 12 hours of vacuum drying was performed at a temperature of 60° C. The obtained dry polymer was analyzed by $^1$H-NMR. The proportional content (mass % or mol %) of each monomer unit or structural unit included in the polymer was calculated based on the obtained analysis values. In addition, the molar ratio of a (meth)acrylic acid ester monomer unit including an aromatic hydrocarbon ring relative to a structural unit (I) was calculated.

<Amount of Solvent-Insoluble Content>

A water dispersion of a polymer was dried in an environment of 50% humidity and 23° C. to 25° C. to produce a film having a thickness of 3±0.3 mm. Next, the produced film was cut up into 5 mm squares so as to prepare film pieces. Approximately 1 g of these film pieces were precisely weighed, and the weight of the precisely weighed film pieces was taken to be W0. The precisely weighed film pieces were immersed in 100 g of a binder composition solvent (temperature 25° C.) for 24 hours. After 24 hours of immersion, the film pieces were pulled out of the solvent, the pulled-out film pieces were vacuum dried at 105° C. for 3 hours, and the weight of these film pieces (weight of insoluble content) W1 was precisely weighed. The amount of solvent-insoluble content (%) was calculated by the following formula.

Amount of solvent-insoluble content (%)=$W1/W0 \times 100$

<Dispersibility>

The viscosity of a slurry composition was measured by a Brookfield B-type viscometer at 60 rpm (25° C.) and was evaluated by the following standard. A smaller slurry composition viscosity indicates better dispersion of functional particles (electrode active material particles, solid electrolyte particles, and/or conductive material particles) contained in the slurry composition.

A: Viscosity of less than 4,000 mPa·s
B: Viscosity of not less than 4,000 mPa·s and less than 5,500 mPa·s
C: Viscosity of not less than 5,500 mPa·s and less than 8,000 mPa·s
D: Viscosity of not less than 8,000 mPa·s or not dispersed (no fluidity)

<Preservation Stability>

A portion of a slurry composition was sampled straight after production. Solvent was removed from the sampled slurry composition through 1 hour of drying on a 130° C. hot plate in order to measure the initial solid content concentration of the slurry composition.

Next, the slurry composition was preserved in a tightly sealed state at 25° C. An upper portion of the preserved slurry composition was sampled at intervals of 1 day (24 hours) up until 6 days had passed, and the solid content concentration was measured by the same method as described above. The number of days of preservation after which the solid content concentration had decreased by at least 1.0% from the initial solid content concentration was recorded and was evaluated by the following standard. A greater number of days indicates that solid content in the slurry composition has a lower tendency to sediment and that the slurry composition has better preservation stability.

A: Reduction of solid content concentration not observed even after 6 days of preservation
B: Reduction of solid content concentration observed after 4 or 5 days of preservation
C: Reduction of solid content concentration observed after 2 or 3 days of preservation
D: Reduction of solid content concentration observed after 1 day of preservation <Adhesiveness>

A rectangle of 1.0 cm in width by 10 cm in length was cut out from an electrode as a test specimen. Cellophane tape (tape prescribed by JIS Z1522) was affixed to the surface at the electrode mixed material layer-side of the test specimen, the cellophane tape was subsequently peeled off in a direction at 180° from one end of the test specimen at a speed of 50 mm/min, and the stress during this peeling was measured. A total of three measurements were made in this manner. An average value of these measurements was determined, was taken to be the peel strength (N/m), and was evaluated by the following standard. A larger peel strength indicates better adhesiveness of the electrode mixed material layer as a functional layer and indicates stronger close adherence with the current collector.

A: Peel strength of 3 N/m or more
B: Peel strength of not less than 2 N/m and less than 3 N/m
C: Peel strength of not less than 1 N/m and less than 2 N/m
D: Peel strength of less than 1 N/m <Output Characteristics: All-Solid-State Secondary Battery>

Three all-solid-state secondary battery cells were charged to 4.2 V by a 0.1 C constant-current method, were subsequently discharged to 3.0 V at 0.1 C, and the 0.1 C discharge capacity was determined. Next, charging was performed to 4.2 V at 0.1 C, discharging was subsequently performed to 3.0 V at 2 C, and the 2 C discharge capacity was determined. An average value of the 0.1 C discharge capacity for the three cells was taken to be discharge capacity (a) and an average value of the 2 C discharge capacity for the three cells was taken to be discharge capacity (b). A ratio (capacity ratio) of the discharge capacity (b) relative to the discharge capacity (a) was calculated (=discharge capacity (b)/discharge capacity (a)×100(%)) and was evaluated by the following standard. A larger value for the capacity ratio indicates that the all-solid-state secondary battery has better output characteristics.

A: Capacity ratio of 90% or more
B: Capacity ratio of not less than 80% and less than 90%
C: Capacity ratio of not less than 50% and less than 80%
D: Capacity ratio of less than 50%

<Output Characteristics: Lithium Ion Secondary Battery (Non-Aqueous Secondary Battery)>

Three lithium ion secondary battery cells were charged to 4.2 V by a 0.2 C constant-current method, were subsequently discharged to 3.0 V at 0.2 C, and the 0.2 C discharge capacity was determined. Next, charging was performed to 4.2 V at 0.2 C, discharging was subsequently performed to 3.0 V at 2 C, and the 2 C discharge capacity was determined. An average value of the 0.2 C discharge capacity for the three cells was taken to be discharge capacity (c) and an average value of the 2 C discharge capacity for the three cells was taken to be discharge capacity (d). A ratio (capacity ratio) of the discharge capacity (d) relative to the discharge capacity (c) was calculated (=discharge capacity (d)/discharge capacity (c)×100(%)) and was evaluated by the following standard. A larger value for the capacity ratio indicates that the lithium ion secondary battery has better output characteristics.

A: Capacity ratio of 90% or more
B: Capacity ratio of not less than 80% and less than 90%
C: Capacity ratio of not less than 50% and less than 80%
D: Capacity ratio of less than 50%

<Cycle Characteristics: All-Solid-State Secondary Battery>

An all-solid-state secondary battery was subjected to 50 cycles of charging and discharging in which it was charged from 3 V to 4.2 V at 0.1 C and then discharged from 4.2 V to 3 V at 0.1 C in a 45° C. environment. A value obtained by calculating the 0.1 C discharge capacity of the $50^{th}$ cycle as a percentage relative to the 0.1 C discharge capacity of the $1^{st}$ cycle was taken to be a capacity maintenance rate A and was evaluated by the following standard. A larger value for the capacity maintenance rate A indicates that there is less reduction of discharge capacity and that the all-solid-state secondary battery has better cycle characteristics.

A: Capacity maintenance rate A of 90% or more
B: Capacity maintenance rate A of not less than 80% and less than 90%
C: Capacity maintenance rate A of not less than 50% and less than 80%
D: Capacity maintenance rate A of less than 50%

<Cycle Characteristics: Lithium Ion Secondary Battery (Non-Aqueous Secondary Battery)>

A lithium ion secondary battery was subjected to 100 cycles of charging and discharging in which it was charged from 3 V to 4.2 V at 1.0 C and then discharged from 4.2 V to 3 V at 1.0 C in a 25° C. environment. A value obtained by calculating the 1.0 C discharge capacity of the $100^{th}$ cycle as a percentage relative to the 1.0 C discharge capacity of the $1^{st}$ cycle was taken to be a capacity maintenance rate B and was evaluated by the following standard. A larger value for the capacity maintenance rate B indicates that there is less reduction of discharge capacity and that the lithium ion secondary battery has better cycle characteristics.

A: Capacity maintenance rate B of 90% or more
B: Capacity maintenance rate B of not less than 80% and less than 90%
C: Capacity maintenance rate B of not less than 50% and less than 80%
D: Capacity maintenance rate B of less than 50%

<Cycle Characteristics (Post-Slurry-Preservation): All-Solid-State Secondary Battery>

A slurry composition was preserved in a tightly sealed state inside a glove box (moisture content: 10 ppm or less) for 48 hours. After preservation, the slurry composition was used to produce an electrode and a solid electrolyte layer in the same way as in each example or comparative example inside a dry room (moisture content: 127 ppm; equivalent to dew point of −40° C.), and then an all-solid-state secondary battery was produced.

The same operations as described above in "Cycle characteristics: All-solid-state secondary battery" were performed, and a value obtained by calculating the 0.1 C discharge capacity of the $50^{th}$ cycle as a percentage relative to the 0.1 C discharge capacity of the $1^{st}$ cycle was taken to be a capacity maintenance rate A' and was evaluated by the following standard. A larger value for the capacity maintenance rate A' indicates that there is less reduction of discharge capacity and that the all-solid-state secondary battery including the electrode formed from the preserved slurry composition has better cycle characteristics.

A: Capacity maintenance rate A' of 90% or more
B: Capacity maintenance rate A' of not less than 80% and less than 90%
C: Capacity maintenance rate A' of not less than 50% and less than 80%
D: Capacity maintenance rate A' of less than 50%

<Cycle Characteristics (Post-Slurry-Preservation): Lithium Ion Secondary Battery (Non-Aqueous Secondary Battery)>

A slurry composition was preserved in a tightly sealed state inside a glove box (moisture content: 10 ppm or less) for 48 hours. After preservation, the slurry composition was used to produce an electrode in the same way as in each example or comparative example inside a dry room (moisture content: 127 ppm; equivalent to dew point of −40° C.), and then a lithium ion secondary battery was produced.

The same operations as described above in "Cycle characteristics: Lithium ion secondary battery (non-aqueous secondary battery)" were performed, and a value obtained by calculating the 1.0 C discharge capacity of the $100^{th}$ cycle as a percentage relative to the 1.0 C discharge capacity of the $1^{st}$ cycle was taken to be a capacity maintenance rate B' and was evaluated by the following standard. A larger value for the capacity maintenance rate B' indicates that there is less reduction of discharge capacity and that the lithium ion secondary battery including the electrode formed from the preserved slurry composition has better cycle characteristics.

A: Capacity maintenance rate B' of 90% or more
B: Capacity maintenance rate B' of not less than 80% and less than 90%
C: Capacity maintenance rate B' of not less than 50% and less than 80%
D: Capacity maintenance rate B' of less than 50%

Example 1

<Production of Binder Composition for Secondary Battery>

A 1 L septum-equipped flask that included a stirrer was charged with 100 parts of deionized water and 0.2 parts of sodium dodecylbenzenesulfonate as an emulsifier, the gas phase was purged with nitrogen gas, and the temperature was raised to 60° C. Thereafter, 0.25 parts of potassium persulfate as a polymerization initiator was dissolved in 20.0 parts of deionized water and was added into the flask.

Meanwhile, a monomer composition was obtained in a separate vessel by mixing 40 parts of deionized water, 1.0 parts of sodium lauryl sulfate as an emulsifier, and 25 parts of phenoxyethyl acrylate, 67 parts of n-butyl acrylate, and 8 parts of acrylonitrile as monomers. The monomer composition was continuously added into the 1 L septum-equipped flask over 3 hours to perform polymerization. The reaction was carried out at 60° C. during addition. Once the addition was complete, a further 3 hours of stirring was performed at 80° C. to complete the reaction. The resultant water dispersion of a polymer was used to measure the amount of diisobutyl ketone (solvent) insoluble content in the polymer and to determine whether the polymer had good solubility or poor solubility in diisobutyl ketone. The result is shown in Table 1.

Next, an appropriate amount of diisobutyl ketone as a solvent was added to the obtained water dispersion of the polymer so as to obtain a mixture. Thereafter, distillation was performed under reduced pressure at 80° C. to remove water and excess diisobutyl ketone from the mixture, and thereby obtain a binder composition (solid content concentration: 8%). The obtained binder composition was used to measure the chemical composition of the polymer. The results are shown in Table 1.

<Production of Slurry Composition for Positive Electrode Mixed Material Layer>

After mixing 70 parts of lithium cobalt oxide (number-average particle diameter: 11.5 μm) as positive electrode active material particles, 25.5 parts of sulfide glass formed of $Li_2S$ and $P_2S_5$ ($Li_2S/P_2S_5$=70 mol %/30 mol %; number-average particle diameter: 0.9 μm) as solid electrolyte particles, 2.5 parts of acetylene black as conductive material particles, and 2 parts (in terms of solid content) of the binder composition obtained as described above and then further adding diisobutyl ketone as a solvent so as to adjust the solid content concentration to 80%, these materials were mixed for 60 minutes in a planetary mixer. Diisobutyl ketone was subsequently further added so as to adjust the solid content concentration to 70%, and then 10 minutes of mixing was performed to produce a slurry composition for a positive electrode mixed material layer. The dispersibility and preservation stability of the obtained slurry composition for a positive electrode mixed material layer were evaluated. The results are shown in Table 1.

<Production of Slurry Composition for Negative Electrode Mixed Material Layer>

After mixing 65 parts of graphite (number-average particle diameter: 20 μm) as negative electrode active material particles, 31.5 parts of sulfide glass formed of $Li_2S$ and $P_2S_5$ ($Li_2S/P_2S_5$=70 mol %/30 mol %; number-average particle diameter: 0.9 μm) as solid electrolyte particles, 1.5 parts of acetylene black as conductive material particles, and 2 parts (in terms of solid content) of the binder composition obtained as described above and then further adding diisobutyl ketone as a solvent so as to adjust the solid content concentration to 65%, these materials were mixed for 60 minutes in a planetary mixer. Diisobutyl ketone was subsequently further added to adjust the solid content concentration to 60%, and then mixing was performed in the planetary mixer to produce a slurry composition for a negative electrode mixed material layer.

<Production of Slurry Composition for Solid Electrolyte Layer>

After mixing 100 parts of sulfide glass formed of $Li_2S$ and $P_2S_5$ ($Li_2S/P_2S_5$=70 mol %/30 mol %; number-average particle diameter: 0.9 μm) as solid electrolyte particles and 2 parts (in terms of solid content) of the binder composition obtained as described above and further adding diisobutyl ketone as a solvent so as to adjust the solid content concentration to 60% inside a glove box (moisture concentration: 0.6 mass ppm; oxygen concentration: 1.8 mass ppm) under an argon gas atmosphere, these materials were mixed for 60 minutes in a planetary mixer. Diisobutyl ketone was subsequently further added to adjust the solid content concentration to 45%, and then mixing was performed in the planetary mixer to produce a slurry composition for a solid electrolyte layer.

<Production of all-Solid-State Secondary Battery>

The slurry composition for a positive electrode mixed material layer was applied onto the surface of a current collector (aluminum foil; thickness: 20 μm) and was dried (120° C., 60 minutes) so as to form a positive electrode mixed material layer of 50 μm in thickness, and thereby obtain a positive electrode. This positive electrode was used to evaluate adhesiveness of the positive electrode mixed material layer. The result is shown in Table 1.

The slurry composition for a negative electrode mixed material layer was applied onto the surface of a separate current collector (copper foil; thickness: 15 μm) and was dried (120° C., 60 minutes) so as to form a negative electrode mixed material layer of 60 μm in thickness, and thereby obtain a negative electrode.

Next, the slurry composition for a solid electrolyte layer was applied onto the positive electrode mixed material layer surface of the positive electrode and was dried (120° C., 60 minutes) so as to form a solid electrolyte layer of 150 μm in thickness, and thereby obtain a solid electrolyte layer-equipped positive electrode.

The solid electrolyte layer-equipped positive electrode and the negative electrode were laminated with the solid electrolyte layer of the solid electrolyte layer-equipped positive electrode and the negative electrode mixed material layer of the negative electrode in contact and were pressed to obtain an all-solid-state secondary battery. The thickness of the solid electrolyte layer in the post-pressing all-solid-state secondary battery was 100 μm. Cycle characteristics and rate characteristics of this all-solid-state secondary battery were evaluated. The results are shown in Table 1.

In addition, the slurry compositions described above (slurry composition for a positive electrode mixed material layer, slurry composition for a negative electrode mixed material layer, and slurry composition for a solid electrolyte layer) were also separately preserved, and then a positive electrode, a negative electrode, a solid electrolyte layer, and an all-solid-state secondary battery were produced by the same procedure as described above with the exception that the preserved slurry compositions were used, and cycle characteristics (post-slurry-preservation) were evaluated. The result is shown in Table 1.

Example 2

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 67 parts of 2-ethylhexyl acrylate, 25 parts of phenoxyethyl acrylate, and 8 parts of acrylonitrile were used as monomers in production of the binder composition for a secondary battery. The results are shown in Table 1.

Example 3

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 30 parts of n-butyl acrylate, 40 parts of lauryl acrylate, 20 parts of phenoxyethyl acrylate, and 10 parts of acrylonitrile were used as monomers in production of the binder composition for a secondary battery. The results are shown in Table 1.

Example 4

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 50 parts of n-butyl acrylate, 40 parts of phenoxyethyl acrylate, and 10 parts of acrylonitrile were used as monomers in production of the binder composition for a secondary battery. The results are shown in Table 1.

Example 5

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 85 parts of n-butyl acrylate, 7 parts of phenoxyethyl acrylate, and 8 parts of acrylonitrile were used as monomers in production of the binder composition for a secondary battery. The results are shown in Table 1.

Examples 6 and 7

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that xylene (Example 6) or butyl butyrate (Example 7) was used instead of diisobutyl ketone as a solvent in production of the binder composition for a secondary battery and the various slurry compositions. The results are shown in Table 1.

Example 8

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 67 parts of n-butyl acrylate, 25 parts of phenyl acrylate, and 8 parts of acrylonitrile were used as monomers in production of the binder composition for a secondary battery. The results are shown in Table 1.

Example 9

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 67 parts of n-butyl acrylate, 25 parts of ethoxylated o-phenylphenol acrylate, and 8 parts of acrylonitrile were used as monomers in production of the binder composition for a secondary battery. The results are shown in Table 2.

Example 10

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 67 parts of n-butyl acrylate, 25 parts of phenoxypolyethylene glycol acrylate, and 8 parts of acrylonitrile were used as monomers in production of the binder composition for a secondary battery. The results are shown in Table 2.

Example 11

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 60 parts of n-butyl acrylate, 29.8 parts of phenoxyethyl acrylate, 10 parts of acrylonitrile, and 0.2 parts of allyl methacrylate were used as monomers in production of the binder composition for a secondary battery. The results are shown in Table 2.

Example 12

A slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that a binder composition for a secondary battery produced as described below was used. The results are shown in Table 2.
<Production of Binder Composition for Secondary Battery>

A reactor was charged with 2 parts of potassium oleate as an emulsifier, 0.1 parts of potassium phosphate as a stabilizer, and 150 parts of water, and then 5 parts of acrylonitrile, 35 parts of 1,3-butadiene, 50 parts of n-butyl acrylate, and 10 parts of phenoxyethyl acrylate as monomers and 0.31 parts of t-dodecyl mercaptan as a molecular weight modifier were further added. Emulsion polymerization was initiated at 10° C. in the presence of 0.015 parts of ferrous sulfate as an activator and 0.05 parts of paramenthane hydroperoxide as a polymerization initiator. At the point at which the polymerization conversion rate reached 85%, 0.2 parts of hydroxylamine sulfate was added per 100 parts of monomer to end polymerization.

Once polymerization had ended, heating was performed, unreacted monomer was collected through steam distillation under reduced pressure at 70° C., and then 2 parts of an alkylated phenol was added as an antioxidant to yield a copolymer latex.

A 1 L autoclave equipped with a stirrer was charged with 400 mL of the obtained copolymer latex (total solid content: 48 g), and then nitrogen gas was passed for 10 minutes in order to remove dissolved oxygen in the copolymer solution. Thereafter, 50 mg of palladium acetate was dissolved in 180 mL of water to which nitric acid had been added in an amount of 4 molar equivalents relative to the Pd and was then added into the autoclave as a hydrogenation reaction catalyst. Purging of the system with hydrogen gas was performed twice, and then the contents of the autoclave were heated to 50° C. in a state in which the pressure was raised to 3 MPa with hydrogen gas, and a hydrogenation reaction was carried out for 6 hours.

The contents were restored to normal temperature, the system was converted to a nitrogen atmosphere, and then an evaporator was used to performing concentrating to a solid content concentration of 40%, and thereby yield a water dispersion of a polymer (hydrogenated nitrile rubber). The obtained water dispersion of the polymer was used to measure the amount of diisobutyl ketone (solvent) insoluble content in the polymer and to determine whether the polymer had good solubility or poor solubility in diisobutyl ketone. The result is shown in Table 2.

Next, an appropriate amount of diisobutyl ketone as a solvent was added to the obtained water dispersion of the polymer so as to obtain a mixture. Thereafter, distillation was performed under reduced pressure at 80° C. to remove water and excess diisobutyl ketone from the mixture, and thereby obtain a binder composition (solid content concentration: 8%). The obtained binder composition was used to measure the chemical composition of the polymer. The results are shown in Table 2.

Example 13

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 58 parts of n-butyl acrylate, 20 parts of phenoxyethyl acrylate, 7 parts of acrylonitrile, and 15 parts of styrene were used as monomers in production of the binder composition for a secondary battery. The results are shown in Table 2.

Examples 14 and 15

<Production of Binder Composition for Non-Aqueous Secondary Battery Positive Electrode Mixed Material Layer (Example 14)>

A water dispersion of a polymer (hydrogenated nitrile rubber) was obtained in the same way as in Example 12. The obtained water dispersion of the polymer was used to measure the amount of N-methylpyrrolidone (solvent) insoluble content in the polymer and to determine whether the polymer had good solubility or poor solubility in N-methylpyrrolidone. The result is shown in Table 2.

Next, an appropriate amount of N-methylpyrrolidone as a solvent was added to the obtained water dispersion of the polymer so as to obtain a mixture. Thereafter, distillation was performed under reduced pressure at 80° C. to remove water and excess N-methylpyrrolidone from the mixture, and thereby obtain a binder composition for a positive electrode mixed material layer (solid content concentration:

8%). The obtained binder composition was used to measure the chemical composition of the polymer. The results are shown in Table 2.

<Production of Binder Composition for Non-Aqueous Secondary Battery Negative Electrode Mixed Material Layer (Example 15)>

A 1 L septum-equipped flask that included a stirrer was charged with 100 parts of deionized water and 0.2 parts of sodium dodecylbenzenesulfonate as an emulsifier, the gas phase was purged with nitrogen gas, and the temperature was raised to 60° C. Thereafter, 0.25 parts of potassium persulfate as a polymerization initiator was dissolved in 20.0 parts of deionized water and was added into the flask.

Meanwhile, a monomer composition was obtained in a separate vessel by mixing 40 parts of deionized water, 1.0 parts of sodium lauryl sulfate as an emulsifier, and 20 parts of phenoxyethyl acrylate, 58 parts of n-butyl acrylate, 5 parts of acrylonitrile, 14 parts of styrene, and 3 parts of ethylene glycol dimethacrylate as monomers. The monomer composition was continuously added into the 1 L septum-equipped flask over 3 hours to perform polymerization. The reaction was carried out at 60° C. during addition. Once the addition was complete, a further 3 hours of stirring was performed at 80° C. to complete the reaction. After completion of the reaction, the solid content concentration was adjusted to 30% to yield a water dispersion of a polymer (binder composition for a negative electrode mixed material layer). The obtained water dispersion of the polymer (binder composition for a negative electrode mixed material layer) was used to calculate the amount of water (solvent) insoluble content in the polymer and to determine whether the polymer had good solubility or poor solubility in water. The result is shown in Table 2. The obtained water dispersion of the polymer (binder composition for a negative electrode mixed material layer) was also used to measure the chemical composition of the polymer. The results are shown in Table 2.

<Production of Slurry Composition for Non-Aqueous Secondary Battery Positive Electrode Mixed Material Layer (Example 14)>

A planetary mixer was charged with 96.5 parts of active material particles NMC532 ($LiNi_{5/10}Co_{2/10}Mn_{3/10}O_2$) based on a lithium complex oxide of Co—Ni—Mn as positive electrode active material particles, 1.5 parts of acetylene black (produced by Denka Company Limited; product name: HS-100) as conductive material particles, and 2 parts (in terms of solid content) of the above-described binder composition for a positive electrode mixed material layer, and was used to mix these materials. In addition, N-methylpyrrolidone was gradually added as a solvent and was mixed therewith by stirring at a temperature of 25±3° C. and a rotation speed of 40 rpm so as to obtain a slurry composition for a positive electrode mixed material layer having a viscosity of 3,600 mPa·s (measured using B-type viscometer; temperature: 25±3° C.; rotor: M4; rotor speed: 60 rpm). The dispersibility and preservation stability of the obtained slurry composition for a positive electrode mixed material layer were evaluated. The results are shown in Table 2.

<Production of Slurry Composition for Non-Aqueous Secondary Battery Negative Electrode Mixed Material Layer (Example 15)>

A planetary mixer was charged with 97 parts of natural graphite (theoretical capacity: 360 mAh/g) as negative electrode active material particles and 1 part (in terms of solid content) of carboxymethyl cellulose (CMC) as a thickener. Deionized water was used to perform dilution to a solid content concentration of 65%, and then 60 minutes of kneading was performed at a rotation speed of 45 rpm. Thereafter, 1.5 parts (in terms of solid content) of the above-described binder composition for a negative electrode mixed material layer was added, and 40 minutes of kneading was performed at a rotation speed of 40 rpm. The viscosity was then adjusted to 3,000±500 mPa·s (measured using B-type viscometer; temperature: 25° C.; rotor speed: 60 rpm) through addition of deionized water to obtain a slurry composition for a negative electrode mixed material layer. The dispersibility and preservation stability of the obtained slurry composition for a negative electrode mixed material layer were evaluated. The results are shown in Table 2.

<Production of Positive Electrode for Non-Aqueous Secondary Battery (Example 14)>

The above-described slurry composition for a positive electrode mixed material layer was applied onto aluminum foil of 20 μm in thickness serving as a current collector by a comma coater such as to have a coating weight of 18±0.5 mg/cm². The aluminum foil was conveyed inside an oven having a temperature of 120° C. for 2 minutes and inside an oven having a temperature of 130° C. for 2 minutes at a speed of 200 mm/min so as to dry the slurry composition on the aluminum foil, and thereby obtain a positive electrode web having a positive electrode mixed material layer formed on the current collector.

The positive electrode mixed material layer-side of the produced positive electrode web was subsequently roll pressed in an environment having a temperature of 25±3° C. so as to obtain a positive electrode having a positive electrode mixed material layer density of 3.20 g/cm³. This positive electrode was used to evaluate the adhesiveness of the positive electrode mixed material layer. The result is shown in Table 2.

<Production of Negative Electrode for Non-Aqueous Secondary Battery (Example 15)>

The above-described slurry composition for a negative electrode mixed material layer was applied onto the surface of copper foil of 15 μm in thickness serving as a current collector by a comma coater such as to have a coating weight of 10±0.5 mg/cm². Thereafter, the copper foil with the slurry composition for a negative electrode mixed material layer applied thereon was conveyed inside an oven having a temperature of 120° C. for 2 minutes and inside an oven having a temperature of 130° C. for 2 minutes at a speed of 400 mm/min so as to dry the slurry composition on the copper foil, and thereby obtain a negative electrode web having a negative electrode mixed material layer formed on the current collector.

The negative electrode mixed material layer-side of the produced negative electrode web was subsequently roll pressed in an environment having a temperature of 25±3° C. so as to obtain a negative electrode having a negative electrode mixed material layer density of 1.65 g/cm³. This negative electrode was used to evaluate the adhesiveness of the negative electrode mixed material layer. The result is shown in Table 2.

<Preparation of Separator (Examples 14 and 15)>

A separator made of a single layer of polypropylene (produced by Celgard, LLC.; product name: Celgard 2500) was prepared as a separator.

<Production of Lithium Ion Secondary Battery (Examples 14 and 15)>

The negative electrode, positive electrode, and separator described above were used to produce a single-layer laminate cell (initial design discharge capacity equivalent to 30 mAh), were arranged inside aluminum packing, and were then subjected to vacuum drying under conditions of 10 hours at 60° C. The aluminum packing was subsequently filled with a LiPF$_6$ solution of 1.0 M in concentration (solvent: mixed solvent of ethylene carbonate (EC)/diethyl carbonate (DEC)=5/5 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery as a non-aqueous secondary battery. The cycle characteristics and rate characteristics of this lithium ion secondary battery were evaluated. The results are shown in Table 2.

In addition, the above-described slurry composition for a positive electrode mixed material layer and slurry composition for a negative electrode mixed material layer were separately preserved, and then a positive electrode, a negative electrode, a separator, and a lithium ion secondary battery were prepared or produced by the same procedure as described above with the exception that the preserved slurry compositions were used, and cycle characteristics (post-slurry-preservation) were evaluated. The result is shown in Table 2.

Example 16

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 70 parts of n-butyl acrylate and 30 parts of phenoxyethyl acrylate were used as monomers in production of the binder composition for a secondary battery. The results are shown in Table 2.

Comparative Example 1

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 40 parts of n-butyl acrylate, 30 parts of phenoxyethyl acrylate, 15 parts of acrylonitrile, and 15 parts of styrene were used as monomers in production of the binder composition for a secondary battery. The results are shown in Table 3.

Comparative Example 2

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 52 parts of n-butyl acrylate, 4 parts of phenoxyethyl acrylate, 18 parts of acrylonitrile, and 26 parts of styrene were used as monomers in production of the binder composition for a secondary battery. The results are shown in Table 3.

Comparative Example 3

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 40 parts of n-butyl acrylate and 60 parts of phenoxyethyl acrylate were used as monomers in production of the binder composition for a secondary battery. The results are shown in Table 3.

Comparative Example 4

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 91 parts of n-butyl acrylate, 4 parts of phenoxyethyl acrylate, and 5 parts of acrylonitrile were used as monomers in production of the binder composition for a secondary battery. The results are shown in Table 3.

Comparative Example 5

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 67 parts of n-butyl acrylate, 8 parts of acrylonitrile, and 25 parts of styrene were used as monomers in production of the binder composition for a secondary battery. The results are shown in Table 3.

Comparative Example 6

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 70 parts of ethyl acrylate, 25 parts of phenoxyethyl acrylate, and 5 parts of acrylonitrile were used as monomers in production of the binder composition for a secondary battery. The results are shown in Table 3.

Comparative Example 7

A binder composition for a secondary battery, a slurry composition for a positive electrode mixed material layer, a slurry composition for a negative electrode mixed material layer, a slurry composition for a solid electrolyte layer, and an all-solid-state secondary battery were produced and various evaluations were performed in the same way as in Example 1 with the exception that 50 parts of methyl acrylate, 40 parts of methyl methacrylate, 5 parts of phenoxyethyl acrylate, and 5 parts of acrylonitrile were used as monomers in production of the binder composition for a secondary battery. The results are shown in Table 3.

In Tables 1 to 3, shown below:

"Molar ratio of aromatic hydrocarbon ring/formula (I)" indicates molar ratio of (meth)acrylic acid ester monomer unit including aromatic hydrocarbon ring relative to structural unit indicated by formula (I);
"PEA" indicates phenoxyethyl acrylate unit;
"PA" indicates phenyl acrylate unit;
"EPA" indicates ethoxylated o-phenylphenol acrylate unit;
"PPA" indicates phenoxypolyethylene glycol acrylate unit;
"BA" indicates n-butyl acrylate unit;
"LA" indicates lauryl acrylate unit;
"EHA" indicates 2-ethylhexyl acrylate unit;
"EA" indicates ethyl acrylate unit;
"MA" indicates methyl acrylate unit;
"MAA" indicates methyl methacrylate unit;
"AN" indicates acrylonitrile unit;
"H-BD" indicates hydrogenated 1,3-butadiene unit;
"ST" indicates styrene unit;
"AMA" indicates allyl methacrylate unit;
"EDMA" indicates ethylene glycol dimethacrylate unit;
"DIK" indicates diisobutyl ketone;
"XY" indicates xylene;
"HB" indicates butyl butyrate;
"NMP" indicates N-methylpyrrolidone;
"Good" indicates good solubility;
"Poor" indicates poor solubility;
"AS" indicates all-solid-state secondary battery; and
"LIB" indicates lithium ion secondary battery.

TABLE 1

| | | | | | Example 1 | Example 2 | Example 3 | Example 4 |
|---|---|---|---|---|---|---|---|---|
| Binder composition | Polymer | Chemical composition | (Meth)acrylic acid ester monomer unit including aromatic hydrocarbon ring | Type | PEA | PEA | PEA | PEA |
| | | | | Proportion [mass %] | 25 | 25 | 20 | 40 |
| | | | Structural unit (I), etc. | Type | BA | EHA | BA | BA |
| | | | | Proportion [mass %] | 67 | 67 | 30 | 50 |
| | | | | Type | — | — | LA | — |
| | | | | Proportion [mass %] | — | — | 40 | — |
| | | | Molar ratio of aromatic hydrocarbon ring/formula (I) [—] | | 0.27 | 0.39 | 0.35 | 0.58 |
| | | | Other structural units | Type | AN | AN | AN | AN |
| | | | | Proportion [mass %] | 8 | 8 | 10 | 10 |
| | | | | Type | — | — | — | — |
| | | | | Proportion [mass %] | — | — | — | — |
| | | | | Type | — | — | — | — |
| | | | | Proportion [mass %] | — | — | — | — |
| | | Property in solvent (good solubility or poor solubility) | | | Good | Good | Good | Good |
| | | Solvent | | | DIK | DIK | DIK | DIK |
| | | Secondary battery | | | AS | AS | AS | AS |
| | | Dispersibility | | | A | A | A | B |
| | | Preservation stability | | | A | A | A | B |
| | | Adhesiveness | | | A | A | A | B |
| | | Output characteristics | | | A | A | A | B |
| | | Cycle characteristics | | | A | A | A | B |
| | | Cycle characteristics (post-slurry-preservation) | | | A | A | A | B |

| | | | | | Example 5 | Example 6 | Example 7 | Example 8 |
|---|---|---|---|---|---|---|---|---|
| Binder composition | Polymer | Chemical composition | (Meth)acrylic acid ester monomer unit including aromatic hydrocarbon ring | Type | PEA | PEA | PEA | PA |
| | | | | Proportion [mass %] | 7 | 25 | 25 | 25 |
| | | | Structural unit (I), etc. | Type | BA | BA | BA | BA |
| | | | | Proportion [mass %] | 85 | 67 | 67 | 67 |
| | | | | Type | — | — | — | — |
| | | | | Proportion [mass %] | — | — | — | — |
| | | | Molar ratio of aromatic hydrocarbon ring/formula (I) [—] | | 0.099 | 0.27 | 0.27 | 0.36 |
| | | | Other structural units | Type | AN | AN | AN | AN |
| | | | | Proportion [mass %] | 8 | 8 | 8 | 8 |
| | | | | Type | — | — | — | — |
| | | | | Proportion [mass %] | — | — | — | — |
| | | | | Type | — | — | — | — |
| | | | | Proportion [mass %] | — | — | — | — |
| | | Property in solvent (good solubility or poor solubility) | | | Good | Good | Good | Good |
| | | Solvent | | | DIK | XY | HB | DIK |
| | | Secondary battery | | | AS | AS | AS | AS |
| | | Dispersibility | | | B | A | A | A |
| | | Preservation stability | | | B | A | A | A |
| | | Adhesiveness | | | B | A | A | B |
| | | Output characteristics | | | B | A | B | A |
| | | Cycle characteristics | | | B | A | B | A |
| | | Cycle characteristics (post-slurry-preservation) | | | B | A | B | A |

TABLE 2

| | | | | Example 9 | Example 10 | Example 11 | Example 12 |
|---|---|---|---|---|---|---|---|
| Binder composition | Polymer | Chemical composition | (Meth)acrylic acid ester monomer unit including aromatic hydrocarbon ring | Type | EPA | PPA | PEA | PEA |
| | | | | Proportion [mass %] | 25 | 25 | 29.8 | 10 |
| | | | Structural unit (I), etc. | Type | BA | BA | BA | BA |
| | | | | Proportion [mass %] | 67 | 67 | 60 | 50 |
| | | | | Type | — | — | — | — |
| | | | | Proportion [mass %] | — | — | — | — |
| | | | Molar ratio of aromatic hydrocarbon ring/formula (I) [—] | | 0.18 | 0.2 | 0.36 | 0.18 |
| | | | Other structural units | Type | AN | AN | AN | AN |
| | | | | Proportion [mass %] | 8 | 8 | 10 | 5 |
| | | | | Type | — | — | — | H-BD |
| | | | | Proportion [mass %] | — | — | — | 35 |
| | | | | Type | — | — | AMA | — |
| | | | | Proportion [mass %] | — | — | 0.2 | — |
| | | Property in solvent (good solubility or poor solubility) | | | Good | Good | Poor | Good |
| | | Solvent | | | DIK | DIK | HB | DIK |
| | | Secondary battery | | | AS | AS | AS | AS |
| | | Dispersibility | | | A | A | B | B |
| | | Preservation stability | | | A | A | B | B |
| | | Adhesiveness | | | A | B | B | B |
| | | Output characteristics | | | A | B | B | B |
| | | Cycle characteristics | | | A | B | B | B |
| | | Cycle characteristics (post-slurry-preservation) | | | A | B | B | B |

| | | | | Example 13 | Example 14 | Example 15 | Example 16 |
|---|---|---|---|---|---|---|---|
| Binder composition | Polymer | Chemical composition | (Meth)acrylic acid ester monomer unit including aromatic hydrocarbon ring | Type | PEA | PEA | PEA | PEA |
| | | | | Proportion [mass %] | 20 | 10 | 20 | 30 |
| | | | Structural unit (I), etc. | Type | BA | BA | BA | BA |
| | | | | Proportion [mass %] | 58 | 50 | 58 | 70 |
| | | | | Type | — | — | — | — |
| | | | | Proportion [mass %] | — | — | — | — |
| | | | Molar ratio of aromatic hydrocarbon ring/formula (I) [—] | | 0.25 | 0.18 | 0.25 | 0.31 |
| | | | Other structural units | Type | AN | AN | AN | — |
| | | | | Proportion [mass %] | 7 | 5 | 5 | — |
| | | | | Type | ST | H-BD | ST | — |
| | | | | Proportion [mass %] | 15 | 35 | 14 | — |
| | | | | Type | — | — | EDMA | — |
| | | | | Proportion [mass %] | — | — | 3 | — |
| | | Property in solvent (good solubility or poor solubility) | | | Good | Good | Poor | Good |
| | | Solvent | | | DIK | NMP | Water | DIK |
| | | Secondary battery | | | AS | | LIB | AS |
| | | Dispersibility | | | B | A | A | B |
| | | Preservation stability | | | A | A | A | B |
| | | Adhesiveness | | | B | A | A | B |
| | | Output characteristics | | | A | | A | B |
| | | Cycle characteristics | | | B | A | | B |
| | | Cycle characteristics (post-slurry-preservation) | | | B | A | A | B |

TABLE 3

| | | | | | Comparative Example 1 | Comparative Example 2 | Comparative Example 3 | Comparative Example 4 |
|---|---|---|---|---|---|---|---|---|
| Binder composition | Polymer | Chemical composition | (Meth)acrylic acid ester monomer unit including aromatic hydrocarbon ring | Type | PEA | PEA | PEA | PEA |
| | | | | Proportion [mass %] | 30 | 4 | 60 | 4 |
| | | | Structural unit (I), etc. | Type | BA | BA | BA | BA |
| | | | | Proportion [mass %] | 40 | 52 | 40 | 91 |
| | | | | Type | — | — | — | — |
| | | | | Proportion [mass %] | — | — | — | — |
| | | | Molar ratio of aromatic hydrocarbon ring/formula (I) [—] | | 0.54 | 0.056 | 1.7 | 0.03 |
| | | | Other structural units | Type | AN | AN | — | AN |
| | | | | Proportion [mass %] | 15 | 18 | — | 5 |
| | | | | Type | ST | ST | — | — |
| | | | | Proportion [mass %] | 15 | 26 | — | — |

TABLE 3-continued

| | | | | | | | | | |
|---|---|---|---|---|---|---|---|---|---|
| | | | | Type | — | — | — | — |
| | | | | Proportion [mass %] | — | — | — | — |
| | | | Property in solvent (good solubility or poor solubility) | | Good | Good | Good | Good |
| | | | Solvent | | DIK | DIK | DIK | DIK |
| | | | Secondary battery | | AS | AS | AS | AS |
| | | | Dispersibility | | D | D | C | C |
| | | | Preservation stability | | D | D | C | D |
| | | | Adhesiveness | | D | D | C | D |
| | | | Output characteristics | | D | D | C | C |
| | | | Cycle characteristics | | D | D | C | C |
| | | | Cycle characteristics (post-slurry-preservation) | | D | D | D | D |

| | | | | | Comparative Example 5 | Comparative Example 6 | Comparative Example 7 |
|---|---|---|---|---|---|---|---|
| Binder composition | Polymer | Chemical composition | (Meth)acrylic acid ester monomer unit including aromatic hydrocarbon ring | Type | — | PEA | PEA |
| | | | | Proportion [mass %] | — | 25 | 5 |
| | | | Structural unit (I), etc. | Type | BA | EA | MA |
| | | | | Proportion [mass %] | 67 | 70 | 50 |
| | | | | Type | — | — | MMA |
| | | | | Proportion [mass %] | — | — | 40 |
| | | | Molar ratio of aromatic hydrocarbon ring/formula (I) [—] | | — | 0.2 | 0.029 |
| | | | Other structural units | Type | AN | AN | AN |
| | | | | Proportion [mass %] | 8 | 5 | 5 |
| | | | | Type | ST | — | — |
| | | | | Proportion [mass %] | 25 | — | — |
| | | | | Type | — | — | — |
| | | | | Proportion [mass %] | — | — | — |
| | | Property in solvent (good solubility or poor solubility) | | | Good | Good | Good |
| | | Solvent | | | DIK | DIK | DIK |
| | | Secondary battery | | | AS | AS | AS |
| | | Dispersibility | | | C | C | C |
| | | Preservation stability | | | C | C | C |
| | | Adhesiveness | | | D | D | D |
| | | Output characteristics | | | C | D | D |
| | | Cycle characteristics | | | C | D | D |
| | | Cycle characteristics (post-slurry-preservation) | | | C | D | D |

It can be seen from Tables 1 and 2 that through the binder compositions of Examples 1 to 16, it was possible to produce a slurry composition having excellent preservation stability and to form a functional layer (positive electrode mixed material layer or negative electrode mixed material layer) having excellent adhesiveness. It can also be seen that dispersibility of a slurry composition was good and that a secondary battery having excellent cell characteristics could be produced in Examples 1 to 16.

On the other hand, it can be seen that dispersibility and preservation stability of a slurry composition, adhesiveness of a functional layer, and cell characteristics of a secondary battery deteriorated in Comparative Examples 1 to 7 in which the used binder composition contained a polymer in which the proportional content of either or both of a (meth)acrylic acid ester monomer unit including an aromatic hydrocarbon ring and a structural unit (I) was outside of a specific range.

INDUSTRIAL APPLICABILITY

According to the present disclosure, it is possible to provide a binder composition for a secondary battery that can produce a slurry composition for a secondary battery having excellent preservation stability and that can cause a functional layer for a secondary battery to display excellent adhesiveness.

Moreover, according to the present disclosure, it is possible to provide a slurry composition for a secondary battery that has excellent preservation stability and can form a functional layer for a secondary battery having excellent adhesiveness.

Furthermore, according to the present disclosure, it is possible to provide a functional layer for a secondary battery that has excellent adhesiveness and a secondary battery that includes this functional layer for a secondary battery.

The invention claimed is:

1. A binder composition comprising a polymer and a solvent, wherein
the polymer includes a (meth)acrylic acid ester monomer unit including an aromatic hydrocarbon ring in a proportion of not less than 5 mass % and not more than 25 mass % and includes a structural unit indicated by formula (I), shown below, in a proportion of not less than 50 mass % and not more than 90 mass %,

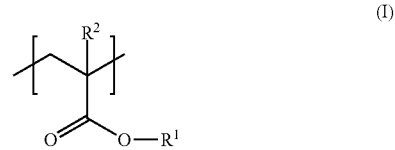

(I)

where, in formula (I), $R^1$ represents a hydrocarbon group having a carbon number of 4 or more that does not include an aromatic hydrocarbon ring, $R^2$ represents a hydrogen atom, a methyl group, or —$CH_2$—C(=O)—O—$R^1$, and in a case in which more than one $R^1$ is present in formula (I), each $R^1$ may be the same or different,
wherein the (meth)acrylic acid ester monomer unit is one or more selected from a group consisting of a phenoxyethyl (meth)acrylate unit, a phenyl (meth)acrylate unit, and an ethoxylated o-phenylphenol (meth)acrylate unit.

2. The binder composition according to claim 1, wherein a molar ratio of the (meth)acrylic acid ester monomer unit including the aromatic hydrocarbon ring and the structural unit indicated by formula (I) in the polymer is not less than 0.08 and not more than 0.80.

3. The binder composition according to claim 1, wherein the polymer further includes one or more selected from a group consisting of a vinyl cyanide monomer unit, a diene monomer unit, and an aromatic vinyl monomer unit.

4. A slurry composition comprising: functional particles; and the binder composition according to claim 1.

5. The slurry composition according to claim 4, wherein the functional particles are one or more selected from a group consisting of electrode active material particles, solid electrolyte particles, and conductive material particles.

6. A functional layer formed using the slurry composition according to claim 4.

7. A secondary battery comprising the functional layer according to claim 6.

\* \* \* \* \*